(12) United States Patent
Tomita

(10) Patent No.: US 6,618,075 B2
(45) Date of Patent: Sep. 9, 2003

(54) AMUSEMENT RIDE CAMERA SYSTEM FOR SHOOTING PICTURES

(75) Inventor: Seijiro Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/135,294

(22) Filed: Aug. 7, 1998

(65) Prior Publication Data

US 2003/0071910 A1 Apr. 17, 2003

Related U.S. Application Data

(63) Continuation of application No. PCT/JP97/04510, filed on Dec. 9, 1997.

(30) Foreign Application Priority Data

Dec. 9, 1996 (JP) .............................................. 8-328277
Dec. 16, 1996 (JP) .............................................. 8-335496

(51) Int. Cl.⁷ ................................................ H04N 7/18
(52) U.S. Cl. ..................................... 348/157; 348/211.6
(58) Field of Search ................................ 348/149, 157, 348/143, 186, 367, 208.14, 211.6

(56) References Cited

U.S. PATENT DOCUMENTS

| | | | | |
|---|---|---|---|---|
| 5,007,096 A | * | 4/1991 | Yoshida | 209/939 |
| 5,508,737 A | * | 4/1996 | Lang | 348/157 |
| 5,531,645 A | * | 7/1996 | Collins | 396/1 |
| 5,655,053 A | * | 8/1997 | Renie | 386/117 |
| 6,111,523 A | * | 8/2000 | Mee | 340/936 |
| 6,160,494 A | * | 12/2000 | Sodi et al. | 340/928 |

FOREIGN PATENT DOCUMENTS

| | | |
|---|---|---|
| JP | 60-153686 | 8/1985 |
| JP | 4-42671 | 2/1992 |
| JP | 6-318294 | 11/1994 |

\* cited by examiner

*Primary Examiner*—Ngoc-Yen Vu
*Assistant Examiner*—Matthew L Rosendale
(74) *Attorney, Agent, or Firm*—Frommer Lawrence & Haug LLP; William S. Frommer; Gordon Kessler

(57) ABSTRACT

A moving object detecting sensor and a speed sensor for measuring the running speed of a moving object are provided, and a shooting timing is decided based on the outputs of these detecting sensor and speed sensor. Thus, since the shooting timing is decided considering the speed of the moving object, even if the speed of the moving object changes, it can be prevented that the center of camera angle deviates from a predetermined shooting position.

6 Claims, 7 Drawing Sheets

AMUSEMENT RIDE CAMERA SYSTEM FOR SHOOTING PICTURES

This is a continuation of copending International Application PCT/JP97/04510 having an international filing date of Dec. 9, 1997.

FIELD OF THE ART

The present invention relates to a moving object shooting system, and is to be applicable to a shooting system for shooting a moving object, for example, such as a roller coaster or the like.

BACKGROUND ART

Recently, a system of shooting the appearance or the expression of the face of passengers who is getting on, in the middle of getting on a roller coaster, a water coaster or the like in an amusement park and selling a photograph by printing it to a person who wants it after the passengers got off, is developed and operated. In this system, for example, on a roller coaster equipment shown in FIG. 1, let trains 3a and 3b composed of plural coupled vehicles 2a to 2f run of which the wheels are held by rails 1.

The passengers pass in front of a control house 4 (there is an operator who sells a ticket or the picture and operates a shooting system control unit 5 exists), go up a stairs 6 and going to a plat home 7, and get on the roller coaster train 3a or 3b. Two trains 3a and 3b are composed of six vehicles in this example, and four seats are provided in each vehicle.

A shooting means 8 is disposed at a position suitable for shooting along the running path of the trains so that the focus is on the passengers of the vehicles. The shooting means 8 may be a still camera or a video camera, and here, it is described by taking a video camera for example. A vehicle detecting sensor 9a composed of an infrared sensor, etc., is disposed on the right of the video camera 8, that is, the coming direction side of the trains to detect the head of a first vehicle 2a. Furthermore, a repeating strobe 10 (here, it is defined as 6 flashes) is disposed near the video camera 8.

If the train closes to the shooting position, the head of the train interrupts the infrared rays of the vehicle detecting sensor 9a, so that the coming of the train is detected. The first flash of the repeating strobe 10 arises at a timing of that the first vehicle 2a entered the angle of the video camera 8, a shutter disposed immediately before the video camera 8 opens and taking an image in, and then the second flash of the strobe 10 arises at a timing of that the second vehicle 2b entered the camera angle and shooting is performed similarly. Hereinafter, also the shooting of the third to the sixth vehicles 2c to 2f is performed similarly. Then, the images taken in by this shooting are sent to the system control unit 5 placed in the control house 4 and stored in a picture memory.

Note that, the video camera 8, vehicle detecting sensor 9a, repeating strobe 10 are connected to the system control unit 5 by cables 11a, 11b and 11c respectively, and transmit each output signal to the system control unit 5 as well as receiving a control signal from the system control unit 5. Then, the pictures of the passengers shot for each vehicle are displayed on a display monitor 12 in which six monitor TVs are arranged, and the picture is printed and provided as the passenger requests it.

FIG. 2 is a block diagram showing the structures of a shooting section and a printing section. The system control unit 5 is provided with an interface section 13, a controller 14 such as a CPU or the like, an RGB frame memory 15a for storing the pictures, a hard disk 15b, a camera control section 16 and a display timing controller 17 or the like.

The video camera 8, vehicle detecting sensor 9a, repeating strobe 10 are connected to the interface section 13 by the cables 11a to 11c respectively, and the interface section 13 and the controller 14 are connected to each other by a signal bus. Thus, the controller 14 controls the video camera 8, vehicle detecting sensor 9a and repeating strobe 10 via these interface section 13 and cables 11a to 11c respectively.

The RGB frame memory 15a is connected to the controller 14 to store the pictures taken in from the video camera 8. The hard disk 15b is connected to the RGB frame memory 15a to ensure sufficient memory capacity for storing many pictures.

The display monitor 12 is connected to the display timing controller 17, and the pictures of each vehicle read from the hard disk 15b are displayed on six monitor TVs 12a to 12f respectively.

Furthermore, three printers 19 are connected to the interface section 13 via a signal distributor 18. Also, for example, a touch screen 20 is connected to the interface section 13 to specify one of the pictures and instruct its printing-out.

Then, as the passenger passes by in front of the display monitor 12 and finds the picture in which himself/herself comes out, he/her tells the operator the number of monitor TV displaying that picture. If the operator inputs the number of the picture of which order is received on the touch screen 20, a print of the specified picture is printed out from the printer 19.

By the way, in the shooting system having the above structure, a timing of cutting the shutter of the video camera 8 is computed and set from the running speed and the space of seats of the coaster on the basis of a signal obtained from the vehicle detecting sensor 9a for detecting the arrival of the train 3a or 3b.

However, a running speed of each train changes by the effects of difference in the maintenance state of coaster, whether, temperature and humidity, so that the focus is to be out of the passengers and a part no passenger exists is shot, and a valueless picture is apt to be generated unfortunately.

As a reference, this relationship between the deviation of the center of camera angle (shot) and the speed of the train is shown in FIGS. 6A to 6F. The length of the vehicle is defined as 5 m, and a predetermined shooting position is defined as the center of the vehicle. FIG. 6B is a state where a shutter opening timing is set so that the center of camera angle comes at the center of the first vehicle 2a in the case of a speed of 70 km/h, and this is defined as the predetermined shooting state. FIG. 6A shows a state where the camera angle deviates rightward from the center of the vehicle when the shutter opening timing is the same condition as the aforementioned case in the case of a speed of 75 km/h (the amount of deviation is 1.6 m).

FIG. 6C shows a state where the camera angle deviates leftward from the center of the vehicle at 65 kilometer an hour and when the shutter opening timing is the same condition as the aforementioned case (the amount of deviation is 1.6 m).

FIG. 6E is a state where the shutter opening timing is set so that the center of camera angle comes at the center of the second vehicle 2b in the case of a speed of 70 km/h, and this is defined as the predetermined shooting state. FIG. 6D shows a state where the camera angle deviates rightward from the center of the second vehicle 2b when the shutter opening timing is the same condition as the aforementioned case at 75 km/h (the amount of deviation is 1.97 m).

FIG. 6F shows a state where the camera angle deviates leftward from the center of the second vehicle 2b when the shutter opening timing is the same condition as the aforementioned case at a speed of 65 km/h (the amount of deviation is 1.97 m). And, pictures with deviated camera angle which are shot in these states (a), (c), (d) and (f) become totally valueless things unfortunately.

DISCLOSURE OF INVENTION

Considering the above points, in such shooting system of a moving object such as a roller coaster or the like, the present invention provides a shooting apparatus without a deviation at the center of camera angle (shooting) even if a speed of each part of the moving object changes.

To solve the above problems, in the present invention, a shooting means disposed at the optimal shooting position of a moving object along a running path of the moving object, a moving object detecting sensor disposed at the coming side of the moving object than the shooting device, a speed sensor for measuring the running speed of the moving object, and a timing control means for deciding a shooting timing of the shooting means based on the outputs of the detecting sensor and the speed sensor, are provided.

In this manner, by providing the moving object detecting sensor and the speed sensor for measuring the running speed of the moving object and deciding the shooting timing based on the outputs of these detecting sensor and speed sensor, even if the speed of the moving object changes, since the shooting timing is decided considering the speed of the moving object, a deviation of the center of camera angle from a predetermined shooting position can be prevented.

Thus, according to the moving object shooting system of the present invention, even if the running speed of the moving object changes by its maintenance state and the change of environment, the shooting can be performed without the center of camera angle deviates from a predetermined shooting position, for example, by always holding boarding persons at the center of the picture.

Furthermore, even if the installation site of the video camera is a position at which the moving object accelerate or decelerate, since the shooting timing is adjusted corresponding to the change of the speed of the moving object changing from one minute to the next, an object (or person) can be always held at the center of camera angle.

Moreover, since a timing to flash the strobe and a flashing period, and a timing to open the shutter are all set reflecting the speed of the vehicle changing, the shutter is opened at the optimal position of each vehicle during the strobe flashes, person is always held at the center of the picture, and it can be clearly shot in high picture quality.

BEST MODE FOR CARRYING OUT THE INVENTION

An embodiment according to the present invention will be described hereinafter referring to FIGS. 1 to 7.

Figure 3:
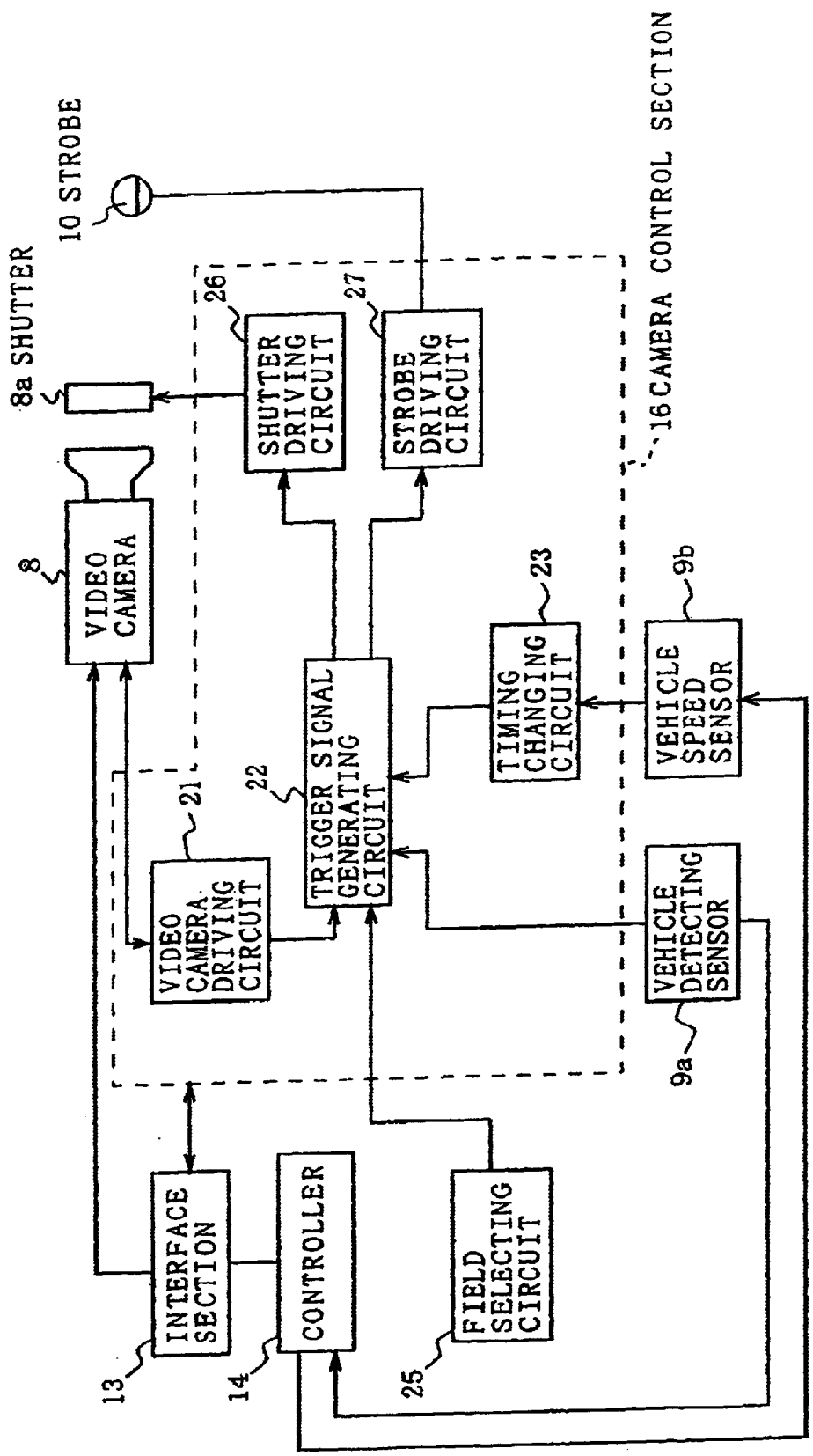
FIG. 3 is a block diagram showing in detail the camera control section of the moving object shooting system.
Figure 4:
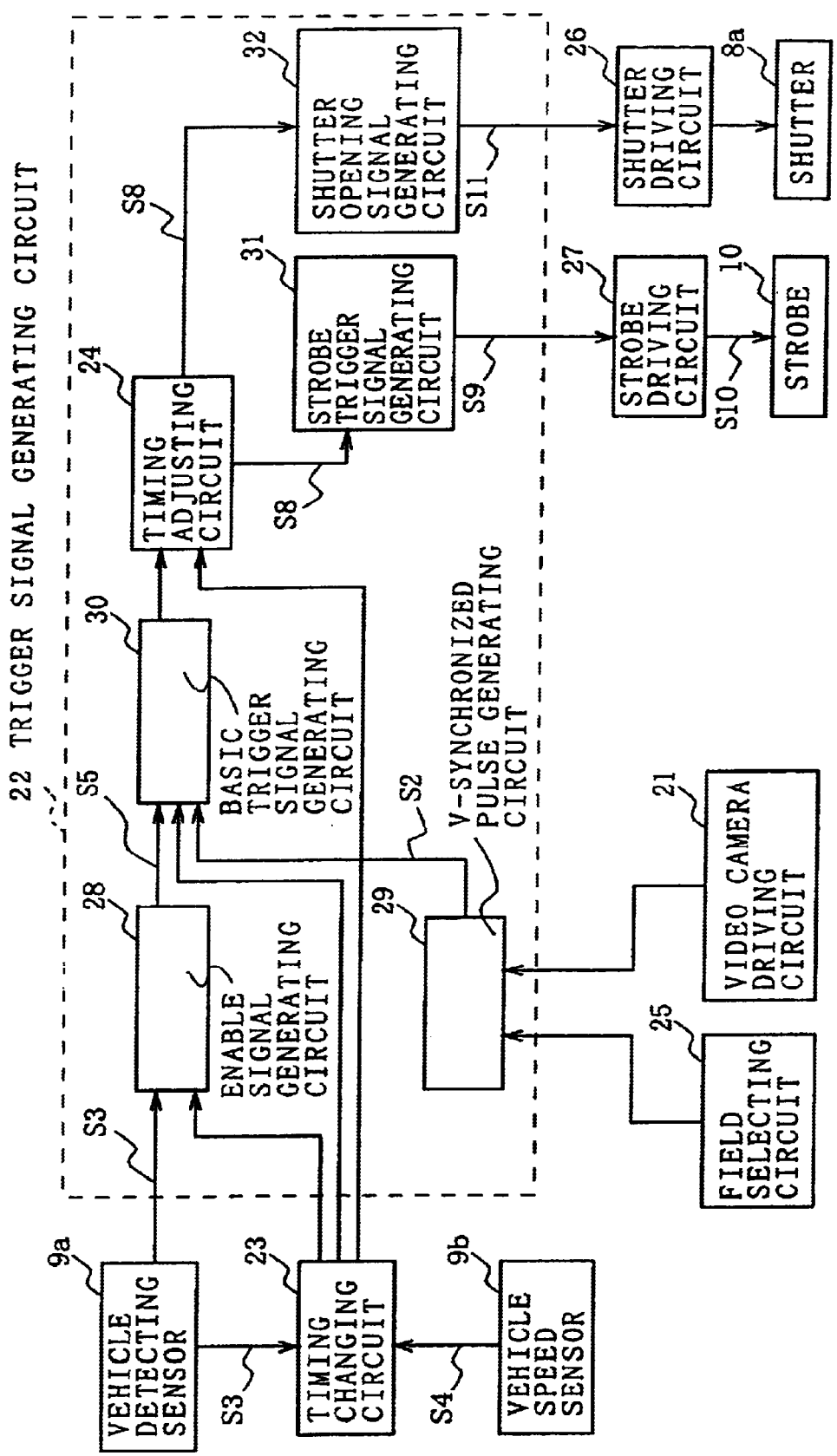
FIG. 4 is a block diagram showing a trigger signal generating circuit in the camera control section.
Figure 5:
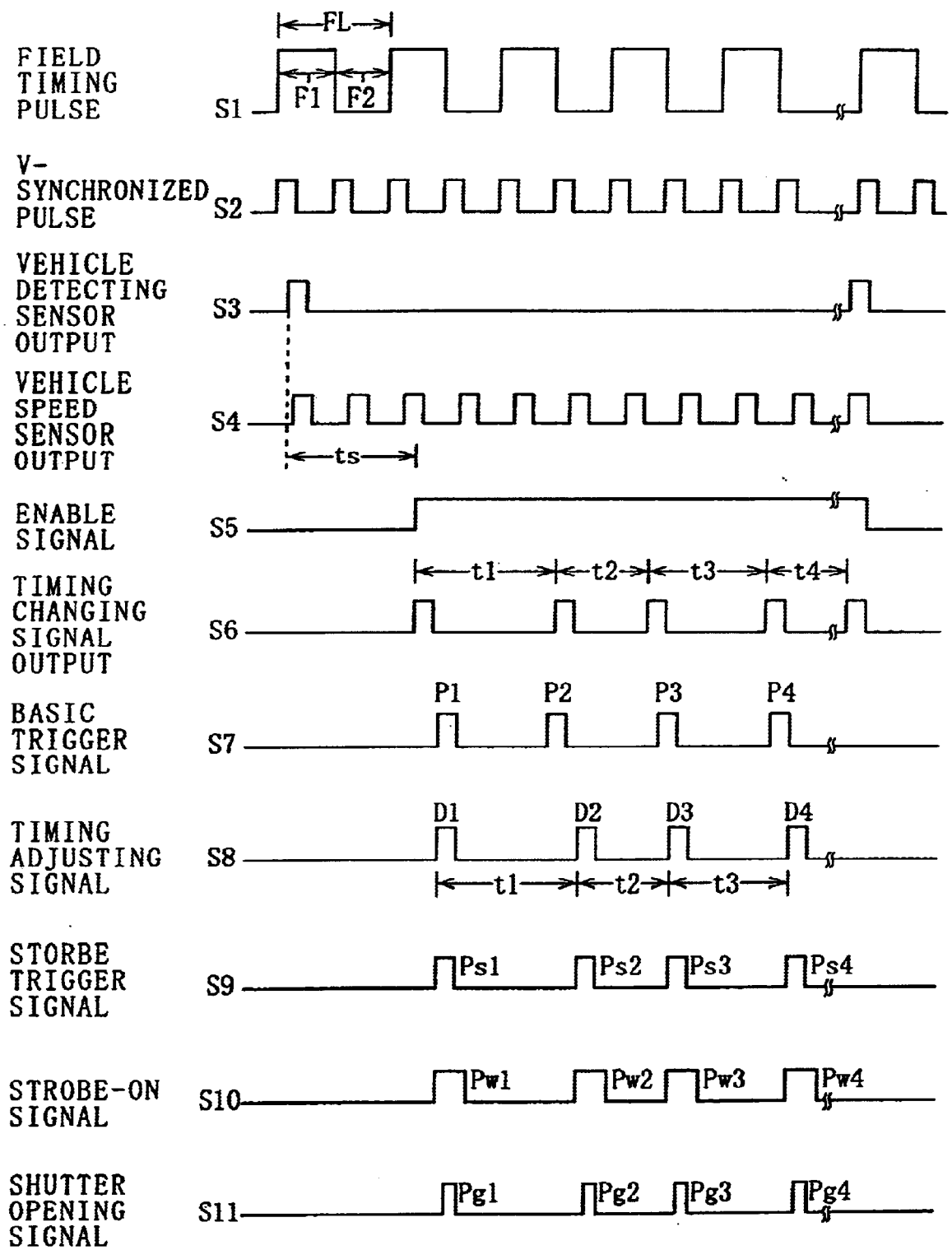
FIG. 5 is a timing chart of signals at each part in the moving object shooting system.
Figure 6:
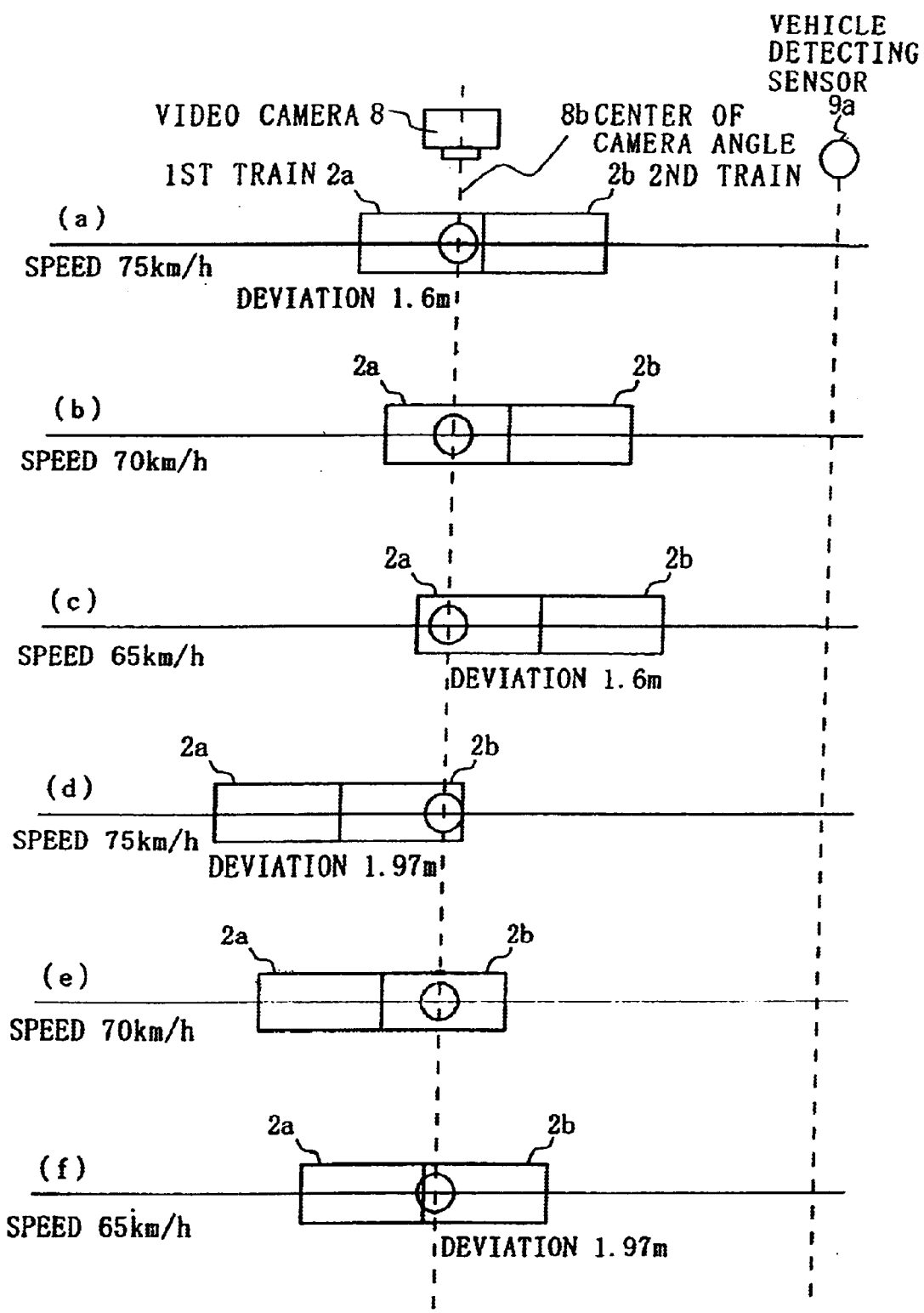
FIGS. 6A to 6F are charts of vehicle position showing the speed of a vehicle being the moving object and the deviation of the center of camera angle.
Figure 7:
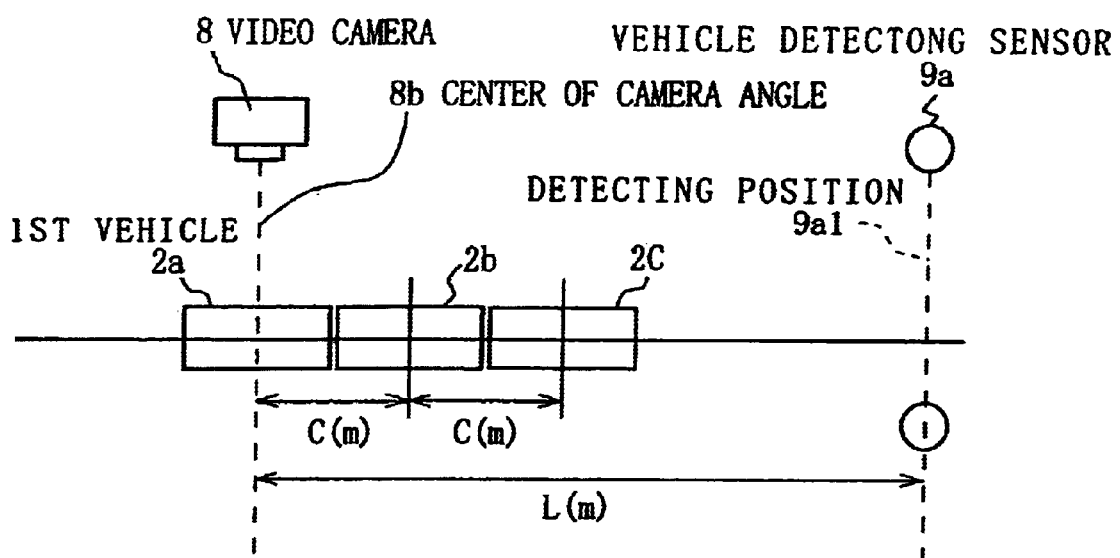
FIG. 7 is a typical diagram showing the relationship between the time from a time when the vehicle is detected by a vehicle detecting sensor till a time when the shutter of the camera opens, and the setup of the moving object and shooting system.

FIG. 3 is a block diagram showing the camera control section of a moving object shooting system in detail; FIG. 4 is a block diagram of the internal configuration of a trigger signal generating circuit; FIG. 5 is a time chart of signals at each part in the moving object shooting system; FIGS. 6A to 6F are charts of vehicle positions showing the vehicle speed being a moving object and the deviation of the center of camera angle; and FIG. 7 is a typical diagram of the relationship between a duration from a time when a vehicle detecting sensor detects the vehicle till a time when the camera shutter is opened, and the setup of the moving object and the shooting system.

Figure 1:
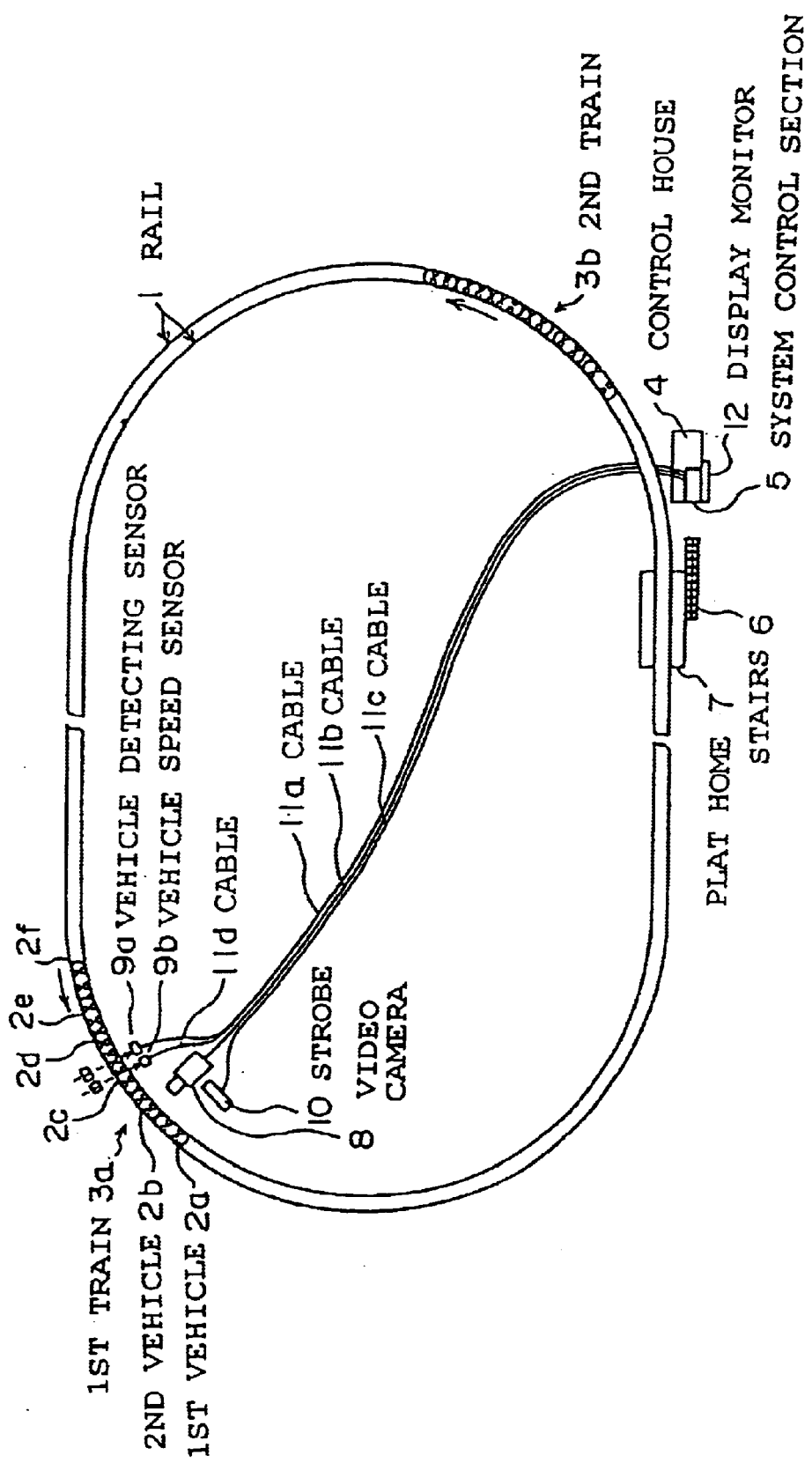
FIG. 1 is a systematic view of a roller coaster equipment mounting a moving object shooting system.
Figure 2:
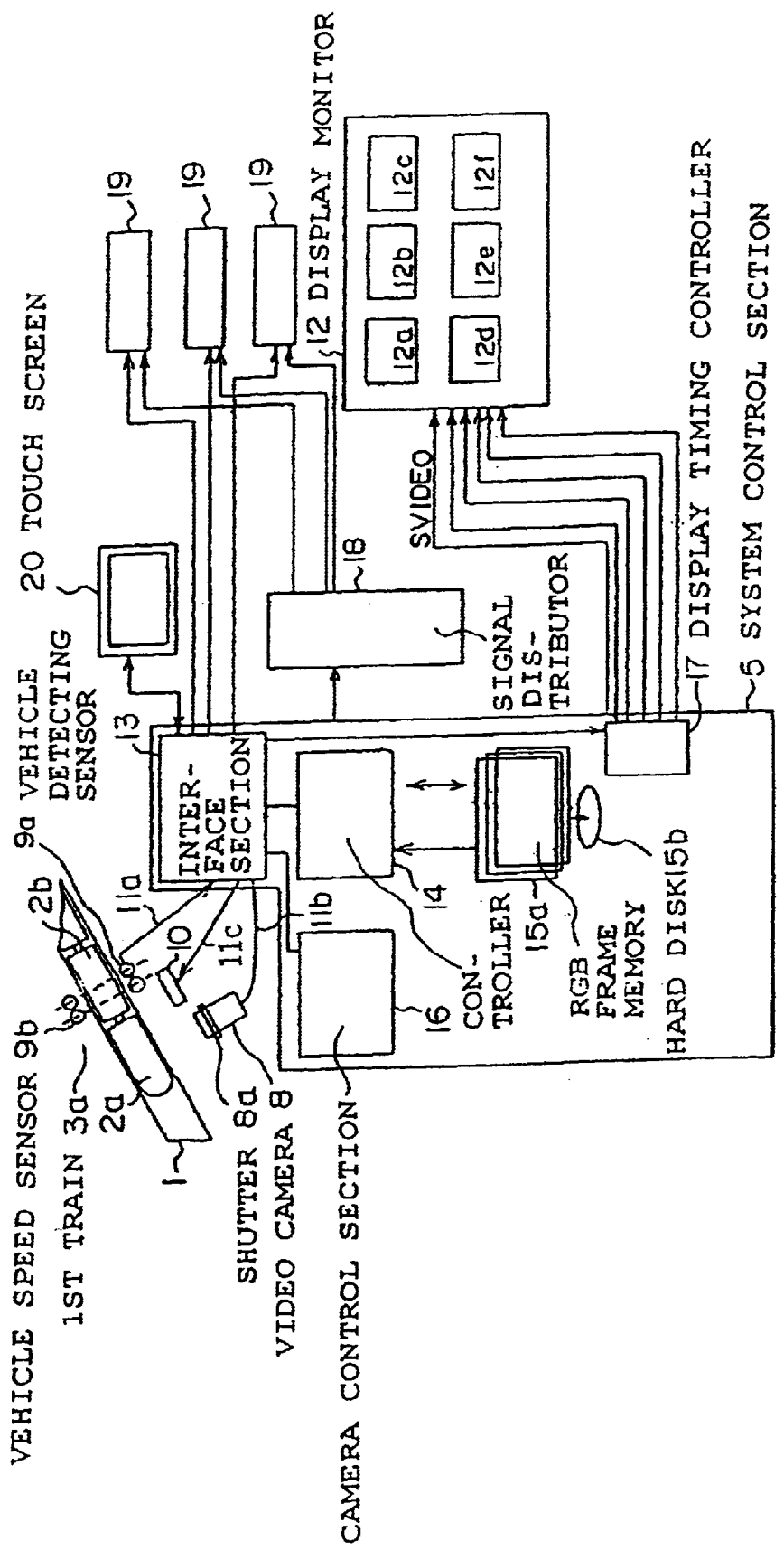
FIG. 2 is a block diagram showing an entire moving object shooting system according to the present invention.

First, as shown in FIGS. 1 and 2, the vehicle speed sensor 9b is provided at the coming side of train 3a or 3b near the video camera 8 at a shooting position. Then, its output is transmitted to a system control unit 5 in a control house 4 by a cable 11d. Similarly, the video camera 8, strobe 10, vehicle detecting sensor 9a are connected to an interface section 13 in the system control unit 5 by cables 11a, 11b and 11c, respectively. A controller 14 such as a CPU or the like, the camera control section 16, a signal distributor 18, a touch screen 20, a printer 19, a display timing controller 17, etc., are connected to the interface section 13.

The camera control section 16 is formed centering the trigger signal generating circuit 22 as shown in FIG. 3, and is a circuit for generating a timing signal to open a high speed shutter 8a formed by liquid crystal etc., which is disposed in front of the video camera 8, and generating a trigger signal to make the strobe 10 flash before opening the shutter 8a.

To this trigger signal generating circuit 22, a picture frame signal and a vertical synchronizing signal from a video camera driving circuit 21, an output signal from the vehicle detecting sensor 9a, and an output signal from a timing changing circuit 23 for changing each control timing by receiving speed information from the vehicle speed sensor 9b are inputted respectively. And from the trigger signal generating circuit 22, a trigger signal to open the shutter is outputted to the shutter driving circuit 26 and a trigger signal to flash the strobe is outputted to the strobe driving circuit 27.

The repeating strobe 10 is connected to the strobe driving circuit 27. In the strobe 10, driving voltage of, for example, six strobe bulbs are previously charged, and they repeatedly flash by the trigger signal from the strobe driving circuit 27, for example, for every 0.24 seconds.

Furthermore, the vehicle detecting sensor 9a and the vehicle speed sensor 9b are connected to the controller 14 respectively. If receiving the detection signal on the front part of the vehicle from the vehicle detecting sensor 9b, the controller 14 outputs a control signal to the vehicle speed sensor 9b so as to start the speed measurement of the vehicle passing through just in front of it. Then, if receiving the detection signal on the rear of the vehicle from the vehicle detecting sensor 9a, the controller 14 outputs a control signal to the vehicle speed sensor 9b so as to stop the speed measurement of the vehicle.

FIG. 4 shows the detailed configuration of this trigger signal generating circuit 22. The trigger signal generating circuit 22 is provided with an enable signal generating circuit 28, V-synchronized pulse generating circuit 29, basic trigger signal generating circuit 30, timing adjusting circuit 24, strobe trigger signal generating circuit 31 and shutter opening signal generating circuit 32. The enable signal generating circuit 28 sets an area enabled the shutter operation based on the output of the vehicle detecting sensor 9a and the output of the timing changing circuit 23.

The V-synchronized pulse generating circuit 29 generates a vertically synchronized pulse signal based on field information set by a first/second field selecting circuit 25 and a control signal which includes a vertically synchronized signal generated by the video camera driving circuit 21. The basic trigger signal generating circuit 30 generates a basic trigger signal which synchronizes with the vertically synchronized pulse signal and to be basis of the setting of a shutter timing from the outputs of the enable signal generating circuit 28, V-synchronized pulse generating circuit 29 and timing changing circuit 23.

The timing adjusting circuit 24 adjusts the optimal timing to open the shutter and to flash the strobe from the basic trigger signal from the basic trigger signal generating circuit 30 and the output signal from the timing changing circuit 23, and generating a timing adjusting signal.

The strobe trigger signal generating circuit 31 decides a timing to flash the strobe 10 based on the output signal from the timing adjusting circuit 24, and outputs a strobe trigger signal to the strobe driving circuit 27.

The shutter opening signal generating circuit 32 generates a timing signal to make the shutter 8a open based on the output signal from the timing adjusting circuit 24 with a slightly delay from the strobe flashing timing, and outputting it to the shutter driving circuit 26.

Next, the operation of the shooting system according to the present invention will be described referring to FIG. 5 showing the relationship of signals at each part. At first, as shown in (S1), a picture frame signal FL which is composed of a first field F1 and a second field F2 is outputted from the video camera 8 to the V-synchronized pulse generating circuit 29. In the case where the signal system is the phase alternating by line color TV system (PAL system), one field is 1/50 second, and one picture is obtained for every 1/25 seconds. Since the PAL has the larger number of scanning lines than an NTSC system and advantageous in picture quality when obtaining a static picture, we applied the PAL system to the embodiment of the present invention.

The vertically synchronized pulse signal S2 is a pulse synchronized with a start signal of each field. If the vehicle detecting sensor 9a detects the passing of the front part of the vehicle, the vehicle detecting sensor 9a generates a detection pulse S3. The timing changing circuit 23 computes a time ts until that the vehicle reaches the center of camera angle 8b at the shooting position of the video camera 8 on the basis of rising of this pulse S3, and transmits the computed time ts to the enable signal generating circuit 28.

In the enable signal generating circuit 28, after receiving the detection pulse S3 from the vehicle detecting sensor 9a, an enable signal S5 is risen after passing of the time ts. And then, as well as receiving the next pulse from the vehicle detecting sensor 9a, the enable signal S5 is fallen. This period that the enable signal S5 is on is a period that the shutter operation is enabled.

This time ts can be computed from, the following equation (1) which is composed of setup, for example, of a distance L between a detected position 9a1 by the vehicle detecting sensor 9a and the center of camera angle 8b of the video camera 8, a train speed V, and a distance C between shooting points between vehicles as shown in FIG. 7.

Furthermore, a duration tn from a time when the shooting point of a certain vehicle (e.g., 2a) passed through the center of camera angle 8b till a time when the shooting point of the next vehicle (e.g., 2b) passes through the same point, can be computed from the following equation (2), as defining the passing speed of the latter vehicle (e.g., 2a) as Vn and the distance between vehicles as C.

$$ts = \frac{1}{V}(L + C/2) \text{ [sec]} \quad (1)$$

$$tn = \frac{C}{Vn} \text{ [sec]} \quad (2)$$

ts: a duration (sec) from a time when the vehicle detecting sensor detects the vehicle front part till the start of the shutter operation enabled period tn: a duration (sec) from a time when a certain vehicle n passes through the center of camera angle 8b till a time when the next vehicle n+1 passes through the same point V: a vehicle speed (m/sec) when the train front part passes through the vehicle detecting sensor Vn: a vehicle speed (m/sec) when the certain vehicle n passes through the vehicle speed sensor 9b L: a distance (m) between the vehicle detecting sensor and the shooting point C: a distance (m) between shooting points between vehicles n: the order of vehicles The enable signal S5 enabling the operation of the shutter 8a is risen after ts (sec) from the rising of the vehicle detecting sensor output signal S3 based on thus obtained time information in the timing changing circuit 23. On the other hand, a field which opens the shutter is selected by the first/second field selecting circuit 25. In this embodiment, it is defined that a vertically synchronized pulse signal in a second field is used as trigger. Thus, as shown in FIG. 5, the first pulse P1 as a basic trigger signal S7 is outputted from the basic trigger signal generating circuit 30 based on the vertically synchronized pulse signal S2, enable signal S5 and field information. The reason why the pulse P1 of the basic trigger signal S7 is not outputted immediately after the passing of the time ts from the vehicle detecting sensor signal output of S3 is because that the second field vertically synchronized pulse signal is defined as trigger in this system. The pulse P1 is risen after waiting for the second field vertically synchronized pulse signal which appears at first after the passing of the time ts. The rising of the basic trigger signal S7 synchronizes with the second field vertically synchronized pulse signal.

The timing adjusting circuit 24 adjusts shutter opening timing based on the basic trigger signal S7 and a timing changing output signal S6 from the timing adjusting circuit 23 so that the center of camera angle 8b coincides with the best shooting position in the vehicle, and transmits the timing adjusting signal S8 to the strobe trigger signal generating circuit 31 and the shutter opening signal generating circuit 32. Since the shooting timing of the first vehicle is synchronized with the first pulse P1 of the basic trigger signal S7, the first pulse D1 of the timing adjusting signal S8 is synchronized with the first pulse of the S7 signal and then outputted. A timing adjusting signal S8 (D2) for the shooting of the next vehicle is outputted after the basic trigger signal S7 is outputted and after a time t1 from the rising of the previous timing adjusting signal S8 (D1). The time tn is a duration between shooting points corresponding to the vehicle speed as described above.

The strobe trigger signal generating circuit 31, by receiving the timing signal S8 from the timing adjusting circuit 24, generates a strobe trigger signal S9 (Ps1 to D1) and outputs it to the strobe driving circuit 27. The strobe driving circuit 27, by receiving the strobe trigger signal S9, outputs a strobe-on period signal S10 (Pw1 to Ps1) to the strobe 10 so as to flash the strobe during a period (pulse width) such that the shutter opening period comes at the center.

The strobe 10, by receiving the strobe-on period signal S10 from the strobe driving circuit 27, flashes during the signal is on. The shutter 8a, by receiving the shutter opening signal S11 from the shutter driving circuit 26, opens the shutter 8a during the signal is on.

On the other hand, the shutter opening signal generating circuit 32, by receiving the timing adjusting signal S8, outputs a shutter opening signal S11 (Pg1 to D1) to the shutter driving circuit 26 having a suitable time lag so that the shutter is opened during the strobe-on period. The shutter driving circuit 26, by receiving this shutter opening signal S11, makes the shutter of the shutter 8a open during the on period.

As described above, since all the strobe trigger signal S9, strobe-on period signal S10 and shutter opening signal S11 are outputted reflecting the speed of the vehicle changing, if the shutter is opened at these timings, the center of camera angle coincides with the best shooting position, and thus a photograph without distortion which is valuable as merchandise is completed. Furthermore, by according to these above signals (S9, S10 and S11), when the shutter opens, the strobe flashes in the maximum brightness, so that lights enters into the video camera 8, and thus a high quality still picture can be obtained.

Note that, in this embodiment, the second field is selected in the first/second field selecting circuit 25, however, the first field may be selected, and either one may be fixed from at first.

Moreover, in this embodiment, the number of installed video camera is one, however, plural video cameras may be installed and the shutter period of each video camera may be lengthened.

According to the aforementioned moving object shooting system, also the correction of an interval of continuous shooting can be performed, so that the picture of each vehicle can be shot stably. According to the shooting system of the present invention, even if the necessity for making plural coasters run on the same course is occurred in a holiday or the like and these coasters are different from each other in running speed, their pictures can be stably recorded. Furthermore, in the case of coupled vehicle, also the interval of continuous shooting can be corrected before shooting.

INDUSTRIAL CAPABILITY

The present invention can be utilized when shooting a person boarding on a moving object such as a roller coaster or the like.

What is claimed is:

1. A moving object picture shooting system comprising:
    a shooting means for shooting a picture of a passenger in a moving object disposed at a desired shooting position of said moving object along a running path of said moving object;
    a moving object detecting sensor disposed along said running path to detect the approaching side of said moving object;
    a speed sensor for measuring a running speed of said moving object;
    a timing control means for deciding on a transit time of said moving object for shooting a picture based on outputs of said detecting sensor and speed sensor,
    wherein said transit time is determined from a distance between said moving object detecting sensor that detects a front part of said moving object and a center of a field of view of a camera angle of a video camera; and
    a field selecting means for selecting a respective field from among a first field and a second field in a frame signal which is generated within said video camera,
    wherein said timing control means controls the operation timing of a shutter and a strobe on the basis of a vertically synchronized pulse signal generated in accordance with at least field information set by said field selecting means.

2. The moving object shooting system according to claim 1, wherein:
    said shooting means comprises a video camera and a shutter means disposed immediately before the lens of said video camera; and
    said timing control means controls a timing to open the shutter of said shutter means.

3. The moving object shooting system according to claim 2, wherein:
    said shooting means has a strobe means nearby; and
    said timing control means controls a flash timing so as to make the strobe of said strobe means flash during the shutter of said shutter means opens.

4. The moving object shooting system according to claim 1, wherein:
    said moving object is a vehicle in an amusement park; and
    a printer for printing out said picture shot by said shooting means is included.

5. The moving object shooting system according to claim 4, wherein:
    said moving object is a vehicle that plural vehicles are coupled and which moves at a high speed;
    said speed sensor measures the speed of said moving object plural times between the head and the rear of said moving object; and
    said timing control means has a function to optimally correct the operation timing of said strobe means and shutter means based on speed information from said speed sensor and each intervehicle distance information so that the shooting is performed at the best shooting position of each vehicle.

6. The moving object shooting system according to claim 5, wherein:
    said detecting sensor is disposed at the coming side of said moving object than said speed sensor and said shooting means, detects the coming of the front part of said moving object and outputting a first detection output signal, and detects the passing of the rear of said moving object and outputting a second detection output signal;
    said speed sensor, by receiving said first detection output signal from said detecting sensor, starts the speed measurement of said moving object, and by receiving said second detection output signal from said detecting sensor, stops the speed measurement of said moving object; and
    said timing control means has functions for computing a duration from a time when said first detection output signal is outputted till a time when the best shooting position of the first vehicle reaches the center of the picture frame of said shooting means, and a duration between the best shot positions of each vehicle following that, as required, in a period between said first detection output signal and said second detection output signal, and for optimally compensating the operation timing of said strobe means and shutter means.

* * * * *